April 23, 1968     HIROSHI KOBAYASHI ETAL     3,379,961

THREE-PHASE LINE VOLTAGE REGULATOR

Filed Nov. 25, 1964     2 Sheets-Sheet 1

INVENTORS
HIROSHI KOBAYASHI
EIJIRO MIYAZAWA
KIYOSHI HISANO

BY *Wendroth, Lund & Ponack*

ATTORNEYS

April 23, 1968   HIROSHI KOBAYASHI ETAL   3,379,961

THREE-PHASE LINE VOLTAGE REGULATOR

Filed Nov. 25, 1964   2 Sheets-Sheet 2

*INVENTORS*
HIROSHI KOBAYASHI
EIJIRO MIYAZAWA
KIYOSHI HISANO

BY *Wendsworth, Lind & Ponack*
ATTORNEYS

United States Patent Office 3,379,961
Patented Apr. 23, 1968

3,379,961
THREE-PHASE LINE VOLTAGE REGULATOR
Hiroshi Kobayashi, Kawasaki, Eijiro Miyazawa, Mitaka and Kiyoshi Hisano, Tokyo, Japan, assignors to Yawata Iron & Steel Co., Ltd., Tokyo, Japan, a corporation of Japan
Filed Nov. 25, 1964, Ser. No. 413,924
3 Claims. (Cl. 323—76)

ABSTRACT OF THE DISCLOSURE

A ferro-resonance type three-phase line voltage regulator, comprising three linear reactors adapted to be inserted between three input terminals of a three-phase alternating current source and three load terminals respectively, a tap on each of the windings of said linear reactors intermediate the ends of the respective reactor on which the tap is located, a four leg type magnetic core consisting of three saturation reactors, one on each one of three legs of said four leg type magnetic core and the fourth leg having no winding on it, said fourth leg parallel to and having the ends thereof spaced from said three legs by an air gap and three condensers, the three windings of said saturation reactors connected in parallel with the three condensers respectively, with each reactor and condenser together forming a ferro-resonance tank circuit, the respective one ends of the tank circuits being Y-connected and the other ends being connected to said taps on the windings of the linear reactors respectively, whereby the output voltage at the load terminals is kept constant.

---

This invention relates to a three-phase line voltage regulator.

In a known conventional three-phase ferro-resonance type line voltage regulating system, for example, as shown in FIGURE 1, three sets of single phase ferro-resonance type line voltage regulating circuits are inserted respectively between lines R and S, between lines S and T and between lines T and R, where R, S and T are the input terminals for the three-phase voltage, the output voltage of each single-phase ferro-resonance circuit is supplied to the primary winding of a transformer $T_R$, $T_S$ or $T_T$, the secondary winding of said transformer is delta-connected to absorb unfavorable third harmonic current in the delta-connection so that the wave distortion of the output three-phase voltage may be reduced. In FIGURE 1, $L_R$, $L_S$ and $L_T$ are linear reactors with mutual induction windings between the lines R and S, between the lines S and T and between the lines T and R, respectively. The tank circuit consisting of $SR_1$ and $C_1$ is a resonance circuit which is resonant at a fundamental frequency so as to keep the voltage supplied to transformer $T_R$ practically constant due to the change in degree of saturation of the reactor $SR_1$ in accordance with the variation of the voltage between R and S, and hence by causing a leading or lagging current to flow in said linear reactor $L_R$. Tank circuits consisting of $SR_2$ and $C_2$ make up the same type of adjusting circuit for between the lines S and T, and tank circuit $SR_3$ and $C_3$ is the adjusting circuit for between the lines T and R.

According to the system shown in FIGURE 1, the distortion in output voltage supplied to transformers $T_R$, $T_S$ or $T_T$ caused by the third harmonic currents generated in the saturation reactors $SR_1$, $SR_2$ and $SR_3$ do not appear on the load side L, as the secondary windings of the transformer are delta-connected and are shorted for the third harmonics. Therefore, the wave form of the output voltage supplied to the load is favorable. However, in the transformer, even at no load, the third harmonic currents flow in the delta-connected secondary windings and therefore the third harmonic currents flow through the primary windings in a quantity of same ampere turns. Therefore, unless the transformer is designed so as to have a capacity considerably larger than the output capacity, the temperature rise will be so great that the transformer will burn. Further, in the system shown in FIGURE 1, saturation reactors, $SR_1$, $SR_2$ and $SR_3$ are wound individually on separate magnetic cores and separate transformers $T_R$, $T_S$ and $T_T$ are also used. Therefore, the number of component parts of the device are so many as to cause the manufacturing cost to be high.

The present invention has eliminated the above mentioned defects.

A principal object of the present invention is to provide a three-phase ferro-resonance type line voltage regulator wherein a three-phase saturation reactor is formed as a single unit by winding each phase winding on a respective leg of a three leg-magnetic core, so that each phase winding operates as $SR_1$, $SR_2$ or $SR_3$, and one end of each said winding is Y-connected with the other windings so that the third harmonic currents can not be generated, as will be shown hereinafter.

Thus, without using transformers $T_R$, $T_S$ and $T_T$ as in the conventional device, unfavorable third harmonic currents are substantially completely eliminated, and by avoiding the use of three separate saturation reactors, a three-phase voltage regulator having a simple construction can be made.

Thus, the cost of the apparatus can thereby be reduced, the efficiency can be increased and the output voltage wave form can be improved.

And another prominent feature of the present invention is that the three-leg magnetic core used for saturation reactor has a fourth leg with a narrow air gap between the fourth leg and the three-leg core. The core will be named a four leg type magnetic core, hereafter, for a saturation reactor. The fourth leg has no winding on it. The three legs having windings on them will be designated as main legs, hereafter. By such an arrangement, a very stable voltage regulator of wide range in out-put capacity can be obtained.

The detailed features of the present invention will be made clear by the following explanation and the accompanying drawings.

Figure 1:
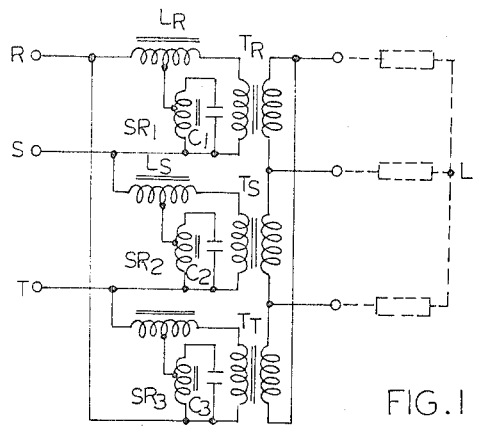
FIGURE 1 is a circuit diagram of a conventional system.
Figure 2:
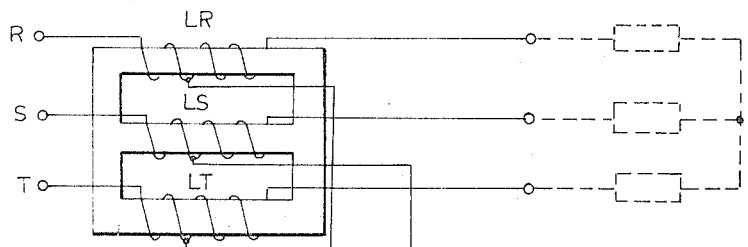
FIGURE 2 is a circuit diagram of an embodiment of the present invention.

In FIG. 2, $L_R$, $L_S$ and $L_T$ are linear reactors with mutual induction windings for the R, S and T phases, respectively. $SR_1$, $SR_2$ and $SR_3$ are saturation reactors for the R, S and T phases, respectively. As indicated in the drawing, the windings of the saturation reactors are respectively wound on main three legs of a four leg type magnetic core. $C_1$, $C_2$ and $C_3$ are resonance condensers cooperating with reactors $SR_1$, $SR_2$ and $SR_3$, respectively, which are resonant at the fundamental frequency. $L_4$ is the fourth leg, having no winding on it and having a narrow gap $L_g$ between the ends thereof and the main three legs.

Figure 3:
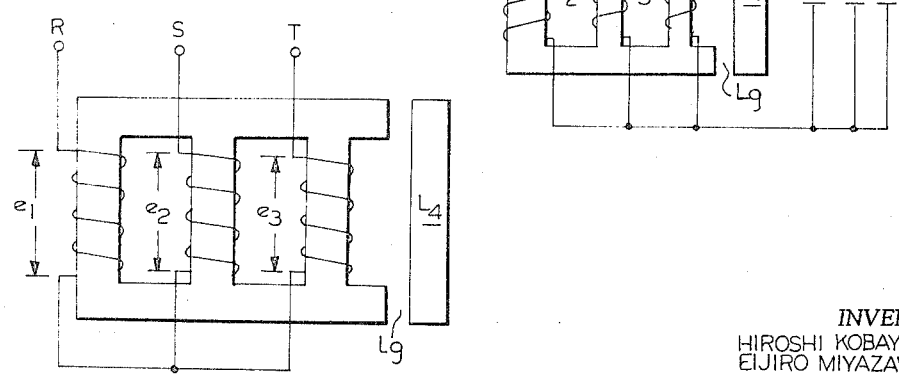
FIGURE 3 is a circuit diagram for explaining the operating principle of the embodiment.

In FIG. 3 are illustrated diagrammatically the Y-connected side of windings of each saturation reactor in the three-phase saturation reactor wound on a four leg type magnetic core as specified by the present invention.

In the first place, we shall explain the function of the main three legs of the saturation reactor.

If the fundamental frequency components of the voltages induced on the above mentioned Y-connected side of windings are $e_1$, $e_2$ and $e_3$, respectively, and the number of turns N of said Y-connected side of windings are equal, we get, according to Faraday's law;

$$\left. \begin{array}{l} N\dfrac{d\phi_1}{dt}=e_1 \\ N\dfrac{d\phi_2}{dt}=e_2 \\ N\dfrac{d\phi_3}{dt}=e_3 \end{array} \right\} \quad (1)$$

wherein $\phi_1$, $\phi_2$ and $\phi_3$ are the fundamental frequency components of the magnetic fluxes at any instant in the main three legs, respectively.

Now, the algebraic sum of the said magnetic fluxes in main three legs is zero, as there is no winding on the fourth leg. Therefore, the condition $$\phi_1+\phi_2+\phi_3=\frac{1}{N}\int_0^t (e_1+e_2+e_3)dt=0 \quad (2)$$

is established at any instant of $t$. Hence, we get $$e_1+e_2+e_3=0 \quad (3)$$

From this relation we can deduce the next relations easily, $$\left. \begin{array}{l} e_1=e_R \\ e_2=e_S \\ e_3=e_T \end{array} \right\} \quad (4)$$

where $e_R$, $e_S$ and $e_T$ are phase voltages of the source of the three-phase voltage, having no zero phase and higher harmonics components, respectively. This means, in the first place, concerning the fundamental component only, that the potential of the Y-connected point of the three-phase saturation reactor is just equal to that of the neutral point of the three-phase source voltage, and that the Y-connected point of the saturation reactors can be separated from the Y-connected point of the condensers as seen in FIG. 4.

Figure 4:
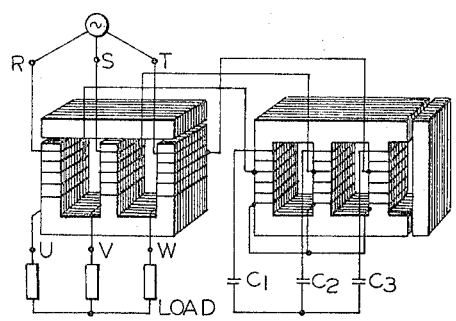
FIGURE 4 is a modified circuit diagram of an embodiment of the present invention.

In the second place, it means, in both the cases of FIG. 2 and FIG. 4, that each phase of the three-phase saturation reactor can be treated in considering its function as if it were an isolated single phase saturation reactor, when an explanation for the constancy of the output voltage is required. Hence, each phase voltage $e_1$, $e_2$ and $e_3$ is kept at the desired constant voltage, independent of the variation of the source voltage, as in the case of the single-phase ferro-resonance voltage regulator.

This demonstrates that the output voltage in the present invention is constant.

Next, the wave form of the output voltage in the present invention will be considered. The currents $i_R$, $i_S$ and $i_T$ of the respective phase, which are Y-connected as shown in FIG. 3, are such that the equation $$i_R+i_S+i_T=0 \quad (5)$$

is always established by Kirchhoff's law. Moreover, since the third harmonic and multiples of third harmonics in $i_R$, $i_S$ and $i_T$ are in the same phase, they must be zero in order that the above Equation 5 holds true. The other higher harmonic components can be eliminated by the action of the fourth leg which will be described later.

Thus, the currents in the saturation reactor of the present invention have a nearly sinusoidal wave form. And as the voltage drops within the linear reactors due to these currents must consequently be substantially sinusoidal, the output voltage also becomes nearly sinusoidal.

Further, in the embodiment in FIG. 2 or in FIG. 4, as stated formerly, the phase voltages $e_1$, $e_2$ and $e_3$ are regulated to an equal and constant value, independent of the variation of the source voltage. And as the conditions of Formula 4 must always be present, the phase differences between $e_1$, $e_2$ and $e_3$ must be 120°. Hence, the output voltage must be normal three-phase voltage constant in magnitude and normal in phase.

In the second place, we shall explain the usefulness of the fourth leg in the saturation reactor.

In a simple case, in which the fourth leg does not exist as in the case of the prior art, the large magnitude of magnetic flux consisted mainly of third harmonics flowing in each saturation reactor leaks outside of the core and causes high temperature rises in the magnetic materials existing near the core.

On the contrary, in the case of FIG. 2 or FIG. 4, in which the fourth leg is added to the main three-legs of the saturation reactor while leaving a narrow gap between the fourth leg and the main legs, the said leakage flux flows easily through the fourth leg and diminishes in the air space, and reduces remarkably the temperature rises in the magnetic materials existing near the core. Thus, the device can be constructed with a larger output capacity than the former invention.

Figure 5:
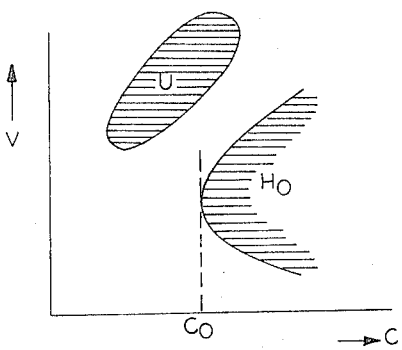
FIGURE 5 is a diagram showing the working condition of the device having only main three legs.

Three phase ferro-resonance type voltage regulators have, in general, a very small range of good working characteristics. For example, in the simple case stated above in which the fourth leg does not exist, the practicable voltage regulator can only be built with a small output capacity. The fact is confirmed by experiments as shown in FIG. 5. In FIG. 5, in which the abscissa is the capacitance of the resonating capacitor, the ordinate is the supplied voltage, there is shown two unfavorable zones. The one, shown by U, is a zone in which stable working can not be obtained. The other, shown by H$o$, is a zone in which the output voltage includes unfavorable higher harmonics.

Thus, the device in such case can not be used for a capacity larger than C$o$ shown in FIG. 5. This fact means that the device can not be used for a large output capacity.

On the contrary, in the device of the present invention, the core has the fourth leg spaced from the main three legs by the narrow air gap, which can be adjusted as desired. The results obtained by experiments are as shown in FIG. 6.

Figure 6:
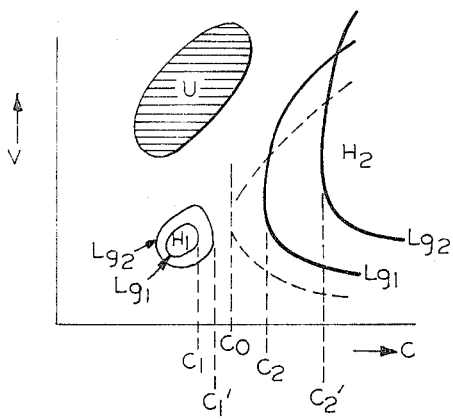
FIGURE 6 is a diagram showing the working condition of the device having a four leg type magnetic core for a saturation reactor.

In FIG. 6, the above stated unfavorable zones are drawn for the cases of air gap length L$g_1$ and L$g_2$ by full lines, and for the case of three leg core without the fourth leg by dotted lines. It must be noted here, in the case of the four-leg type core, the H$o$ zone separates and appears in two parts as shown by H$_1$ and H$_2$ in the graph.

As seen in the graph, allowable range of capacity is C$_1$ to C$_2$ for the case of air gap L$g_1$, and is C$'_1$ to C$'_2$ for the case of air gap L$g_2$. Thus, the allowable range of C moves along the abscissa. This fact means that we can shift the zone H artificially by changing the length of air gap L$g$, and that we can construct even for large output capacity a suitable voltage regulator having good wave form by selecting the proper length of air gap by which to space the fourth leg.

The device can be constructed by dividing the fourth leg into two halves, i.e., the fourth and fifth leg, both having a definite and adequate air gap and located symmetrically relative to the main three legs.

The device can be so modified in the construction of main three legs, that the each leg has a slightly different cross-sectional area from the other. This modification enables the three legs to have equal magnetic flux in them and to avoid the slight unbalance of the output voltage between each phase.

What we claim is:

1. A ferro-resonance type three-phase line voltage regulator, comprising three linear reactors adapted to be inserted between three input terminals of a three-phase alternating current source and three load terminals respectively, a tap on each of the windings of said linear reactors intermediate the ends of the respective reactor on which the tap is located, a four leg type magnetic core consisting of three saturation reactors one on each one of three legs of said four leg type magnetic core and the fourth leg having no winding on it, said fourth leg being parallel to and having the ends thereof spaced from said three legs by an air gap, and three condensers, the three windings of said saturation reactors connected in parallel with the three condensers respectively, with each reactor and condenser together forming a ferro-resonance tank circuit, the respective one ends of the tank circuits being Y-connected and the other ends being connected to said taps on the windings of the linear reactors respectively, whereby the output voltage at the load terminals is kept constant.

2. A ferro-resonance type line voltage regulator as claimed in claim 1 wherein the saturation characteristics of said main three-leg magnetic core and the length of air gap in the fourth leg having no winding on itself are such that the magnetic fluxes in the magnetic core make the wave form of the current in the ferro-resonance tank circuit substantially sinusoidal.

3. A ferro-resonance type line voltage regulator as claimed in claim 1, wherein the inductance of each saturation reactor and the capacity of the condenser connected in parallel with said inductance are such that they resonate with the fundamental wave of the alternating current source.

References Cited
UNITED STATES PATENTS

| | | | |
|---|---|---|---|
| 2,363,881 | 11/1944 | Lord | 323—85 |
| 2,664,541 | 12/1953 | Henderson | 323—45 |
| 3,205,430 | 9/1965 | Tango et al. | 323—76 |
| 3,244,967 | 4/1966 | Tango et al. | 323—89 |

JOHN F. COUCH, *Primary Examiner.*

W. E. RAY, *Examiner.*